United States Patent
Naik et al.

(10) Patent No.: US 11,895,530 B2
(45) Date of Patent: Feb. 6, 2024

(54) SYSTEM AND METHOD FOR OUT-OF-ORDER TRANSMISSION STREAM OF CONTENT VIA AMBIENT INTELLIGENT ONE-TO-MANY TRANSMISSION MODE

(71) Applicant: Saankhya Labs Pvt. Ltd., Bangalore (IN)

(72) Inventors: Parag Naik, Bangalore (IN); Anindya Saha, Bangalore (IN); Arindam Chakraborty, Ghaziabad (IN); Preetham Uthaiah, Bangalore (IN); Sandeep Pendharkar, Bangalore (IN); Yogesh Singh, Bangalore (IN); Deepak Samaga, Bangalore (IN)

(73) Assignee: SAANKHYA LABS PVT. LTD., Bangalore (IN)

( * ) Notice: Subject to any disclaimer, the term of this patent is extended or adjusted under 35 U.S.C. 154(b) by 254 days.

(21) Appl. No.: 17/420,711

(22) PCT Filed: Jun. 5, 2020

(86) PCT No.: PCT/IN2020/050503
§ 371 (c)(1),
(2) Date: Jul. 5, 2021

(87) PCT Pub. No.: WO2020/245844
PCT Pub. Date: Dec. 10, 2020

(65) Prior Publication Data
US 2022/0095155 A1    Mar. 24, 2022

(30) Foreign Application Priority Data

Jun. 6, 2019 (IN) ............................. 201941022363

(51) Int. Cl.
*H04W 28/02* (2009.01)
*H04L 65/80* (2022.01)

(52) U.S. Cl.
CPC ......... *H04W 28/0273* (2013.01); *H04L 65/80* (2013.01); *H04W 28/0289* (2013.01)

(58) Field of Classification Search
CPC .......... H04W 28/0273; H04W 28/0289; H04L 65/80
See application file for complete search history.

(56) References Cited

U.S. PATENT DOCUMENTS 9,769,819 B2 * 9/2017 Rapaport .............. H04W 72/30
10,965,966 B1 * 3/2021 Wu ......................... H04L 65/80
(Continued)

*Primary Examiner* — Abdullahi Ahmed

(57) ABSTRACT

A system and method for switching one or more User Equipment (UEs) 116A-N from a unicast mode to a broadcast or multicast mode to transmit a streaming media content to the UEs 116A-N is provided. The system includes, an Over-the-top (OTT) platform 104, a CDN 112, the UEs 116A-N, a cellular core network 202, one-to-many offload core 204, an analytics engine 206, a database 208, one-to-many transmitter 210, a real time switching module 212, a Cellular base station 214 and a user specified rules module 222. The analytics engine 206 continuously analyzes real-time and historical data stored in the database 208 to identify the UEs 116A-N that receive a streaming media content through the unicast mode and the streaming media content to be offloaded. An offload is a process by which certain portions of the streaming media content is shifted from the unicast mode to the broadcast or multicast mode.

23 Claims, 11 Drawing Sheets

(56) References Cited

U.S. PATENT DOCUMENTS

| | | | |
|---|---|---|---|
| 2014/0095668 A1* | 4/2014 | Oyman | H04L 43/16 709/219 |
| 2015/0030022 A1* | 1/2015 | Mantin | H04L 12/18 370/390 |
| 2015/0049762 A1* | 2/2015 | Mantin | H04L 65/80 370/390 |
| 2016/0183226 A1* | 6/2016 | Rapaport | H04W 72/23 370/312 |
| 2023/0096176 A1* | 3/2023 | Pichaimurthy | H04N 21/2347 725/31 |

* cited by examiner

| OTT PLATFORM 302 | CDN 304 | MOBILE NETWORK PROVIDER 306 | USER DEVICES 308 | SOCIAL MEDIA 310 | BROADCAST SERVICE PROVIDER 312 | EXTERNAL EVENTS 314 | HISTORICAL DATA 316 |
|---|---|---|---|---|---|---|---|
| USER ID | CONTENT ID | NETWORK CONGESTION DATA | USER ID | TOP LIKED/ SHARED OOT PROGRAMS ON FACEBOOK, INSTA,SNAPCHAT, TWITTER | ENERGY COST OF SWITCHING | NATURAL DISASTERS | TIME STAMPED DATA OF ALL THE LEFT SIDE COLUMNS |
| | IP ADDRESS OF UE | | | | | | |
| CONTENT ID | ROUND-TRIP DELAY | AVAILABLE BANDWIDTH IN A CELL | CONTENT ID | CONTENT RECOMMENDED/ LIKED BY AN USER WHO HAS VERY HIGH OF FOLLOWERS | AVAILABLE BANDWIDTH PER CHANNEL | GOVT.BACKED NOTIFICAATIONS | WATCH HISTORY FROM OTT PLATFORM |
| CONTENT DETAILS | VIDEO PLAY DETAILS | HISTORICAL DATA ON NETWORK CONGESTION | DEVICE TYPE: T.V / MOBILE / TABLET | | AVAILABLE TIME SLOT PER CHANNEL | SCHEDULE FOR OVER THE AIR SOFTWARE UPGRADES | USER LOCATION PATTERN |
| LENGTH / CONTENT META DATA | PLAY/ STOP TIME / PAUSE TIME | | | | | | |

FIG. 3A

| OTT PLATFORM 302 | CDN 304 | MOBILE NETWORK PROVIDER 306 | USER DEVICES 308 | SOCIAL MEDIA/ TORRENT 310 | BROADCAST SERVICE PROVIDER 312 | EXTERNAL EVENTS 314 | HISTORICAL DATA 316 |
|---|---|---|---|---|---|---|---|
| USER LOCATION | | TIME OF THE DAY | SIGNAL STRENGTH | VIDEOS FROM NEWS CHANNELS | MONETIZATION FACTOR | SCHEDULED BROADCAST EVENTS | NETWORK CONGESTION PATTERN AND SIGNAL STRENGTH ON EDGES |
| TIME REMAINING FOR STREAMING FOR EACH USER | | | TIME OF THE DAY | POPULAR AND RECENT TORRENT DOWNLOADS | | EMERGENCY ALERTS | |
| SUBSCRIPTION LISTS | | | USER CALENDAR EVENTS (SCHEDULED TO FLY OR TRAVEL) | | | | BROADCAST SERVICES FREE BANDWIDTH PATTERN |
| CONTENT SEGMENT INFORMATION | | | LOCATION | | | | |
| USER DATA LIKE VIEWING HISTORY, TIME HISTORY ETC.. | | | | | | | CDN LOAD DISTRIBUTION |

FIG.3B

SYSTEM AND METHOD FOR OUT-OF-ORDER TRANSMISSION STREAM OF CONTENT VIA AMBIENT INTELLIGENT ONE-TO-MANY TRANSMISSION MODE

CROSS-REFERENCE TO RELATED APPLICATIONS

This patent application claims priority to pending Indian complete application 201841037639 filed on Oct. 4, 2018 and Indian provisional patent application no. 201941022363 filed on Jun. 6, 2019, the complete disclosures of which, in their entireties, are hereby incorporated by reference.

BACKGROUND

Technical Field

The embodiments herein generally relate to reducing several unicast streams corresponding to a common OTT non-linear content in a communication network by incorporating one to many networks, and more particularly, reducing traffic load in a Content delivery platform, cellular core network and a radio access network.

Description of the Related Art

Consumers of streaming media content receive a content from their content providers through a one-to-one delivery method. The content is unicasted to a user device. This method of delivery employs a lot of bandwidth and for managing the dynamic demands for a streaming media content, the ISPs have providers must employ elastic Content Delivery Networks (CDN).

More specifically, when the demand for streaming media content is high, cost directly goes up as the number of users rises, even though they may be consuming a common content. This is because traditional methods use unicast delivery where each user receives an individual stream. This leads to inefficient utilization of bandwidth. Bandwidth requirement can explode when demand is high leading to network congestion.

Further, at any point in time, there is a plurality of users who view the same streaming media content. For all these users, the same content is replicated in the CDNs in order to facilitate the one-to-one transmission stream which is traditionally employed. This results in an in-effective usage of bandwidth because multiple copies of the same data are created and transmitted in parallel to multiple user devices at the same point in time. Also, the CDN must handle multiple sessions for the same content.

In real-time, there always remains sets of users who view the same streaming media content at the same time, for whom the transmission stream to the user device remains the same. This type of linear content can be broadcasted efficiently to all users. In a typical non-linear content delivery system, even though the number of users is consuming the same content, there may be a finite time difference between the start of viewing instance among them. So, by simply shifting the content to broadcast may not work, unlike the case of live-streamed content.

Accordingly, there is a need for mitigating and/or overcoming drawbacks associated with current systems and methods.

SUMMARY

In view of the foregoing, embodiments herein provide a system for switching at least one User Equipment (UE) from a unicast mode to a broadcast or multicast mode to transmit a streaming media content to the at least one User Equipment (UE). The system includes a database, an analytics engine, a one-to-many offload core and a real-time switching module. The database stores real-time and historical data received from one or more sources. The analytics engine continuously analyzes the real-time and the historical data stored in the database to identify the at least one UE that receives a streaming media content through the unicast mode and the streaming media content to be offloaded. In some embodiments, an offload is a process by which certain portions of the streaming media content is shifted from the unicast mode to the broadcast or multicast mode. The analytics engine generates a cluster of UEs that receive a same streaming media content based on identified UEs. The analytics engine performs a cluster pruning to generate a sub cluster of UEs from the cluster of UEs. The analytics engine prioritizes and ranks each sub cluster of the UE to be offloaded and places prioritized sub cluster of the UEs in an offload queue based on a switching benefit analysis. The one-to-many offload core fetches entries correspond to the streaming media content and the at least one UE from the offload queue. The one-to-many offload core schedules the streaming media content for the broadcast or the multicast mode based on a number of channels and an available bandwidth. The one-to-many offload core sends a trigger to each of the UEs that needs to start receiving the streaming media content in the broadcast or the multicast mode. The real-time switching module associated with the at least one UE that switches the at least one UE from the unicast mode to the broadcast or the multicast mode based on the trigger received from the one-to-many offload core.

In some embodiments, the one or more sources include an OverTheTop (OTT) platform, the CDN, a mobile network provider, the at least one UE, a social media, a broadcast service provider, external events and the historical data.

In some embodiments, the OTT platform provides OTT Platform data such as user ID, a content ID, content details, details of user location, time remaining for streaming a corresponding media content for each user in the unicast mode, a subscription list, content segment information and user data.

In some embodiments, the social media provides top liked or shared contents on social media, content recommended or liked by a user who has very high followers, videos from news channels, and popular and viral contents.

In some embodiments, the broadcast service provider provides a cost function that includes a cost of switching, an available bandwidth per channel, an available time slot per channel and a cost of a download bit.

In some embodiments, the external events include natural disasters, emergency alerts, community level useful information government backed notifications, a schedule for over the air software upgrades and scheduled broadcast events.

In some embodiments, the historical data include time stamped data, watch history from the OTT platform, a user location pattern, congestion data of a mobile network provider, a network congestion pattern and signal strength on edges, broadcast services free bandwidth pattern, a CDN load distribution, a subscription list data in the OTT platform and content recommended data in the social media.

In some embodiments, the mobile network provider includes network congestion data, available bandwidth in a cell, historical data on network congestion and time of the day.

In some embodiments, the at least one UE includes a user ID, a content ID, a device type, signal strength, time of the day, user calendar events and a location of the at least one UE.

In some embodiments, the analytics engine identifies the at least one UE for a supplemental downlink delivery if the analytics engine determines that a particular streaming media content that is not suitable for the broadcast or the multicast mode. In some embodiments, at least one part of a broadcast pipe is partitioned to provide unicast services in a form of the supplementary downlink channel. In some embodiments, the analytics engine determines the particular streaming media content is not suitable for the broadcast or the multicast mode based on the location or the cost function of the at least one UE.

In some embodiments, a broadcast or multicast coverage that permits a usage of a Multi Frequency Network (MFN) mode of operation. In some embodiments, the Multi Frequency Network mode of operation is used if a consumption of the particular streaming media content is highly localized.

In some embodiments, the analytics engine performs the cluster pruning by estimating the probability of users watching an entire length of the streaming media content in the unicast mode. In some embodiments, the probability is estimated based on details associated with the streaming media content and meta-data that includes a duration, and popularity of the streaming media content.

In some embodiments, the probability of the users watching the entire length of the streaming media content is estimated based on a time of the day, a device type and the location of the at least one UE.

In some embodiments, the probability of the users watching the entire length of the streaming media content is estimated based on user location pattern data that includes the location and a commute time for the users. In some embodiments, the commute time for the users is estimated based on changes in the location of the at least one UE. In some embodiments, the probability of the users watching the streaming media content is high for the commute time of the users.

In some embodiments, the probability of the users watching the entire length of the streaming media content is estimated based on multitude of data. In some embodiments, the multitude of data is the OTT platform data includes a subscription list of the users, viewing habits of the users and viewing history of the users.

In some embodiments, the analytics engine estimates a duration of the streaming media content remaining to be transmitted in the unicast mode based on the OTT Platform data such as the time remaining for streaming the corresponding media content for each user in the unicast mode.

In some embodiments, the analytics engine prunes the cluster of UEs by excluding UEs which probability is below a user specified threshold level. In some embodiments, the user specified threshold level is specified in a user specified rules file that is communicated with the analytics engine. In some embodiments, the user specified rules file includes analytics rules.

In some embodiments, a Domain Specific Language (DSL) that enables the users to externally specify the analytics rules. In some embodiments, the Domain Specific Language (DSL) enables the users to tune or change a behavior of the analytics engine without having to modify the analytics engine.

In some embodiments, the analytics engine performs the switching benefit analysis based on at least one of (i) a continuous mode, (ii) a periodic mode, or (iii) an event mode. In some embodiments, the analytics engine continuously processes high frequency data and performs the switching benefit analysis on real time basis in the continuous mode. In some embodiments, the analytics engine accumulates the high frequency data for an extended period of time and the performs the switching benefit analysis periodically in the periodic mode. In some embodiments, the analytics engine is triggered to quantify a viewership of an event in the event mode.

In some embodiments, if the one-to-many offload core offloaded a previously identified streaming media content, the analytics engine performs the switching benefit analysis continuously to update the offload queue.

In some embodiments, the analytics engine prioritizes and ranks each sub-cluster of the UEs by computing a network congestion reduction for the each of the sub-clusters of the UEs. In some embodiments, highest reduction in network congestion includes the highest priority in the offload queue.

In some embodiments, the analytics engine performs the switching benefit analysis for the network congestion reduction based on (i) a duration of the streaming media content remaining in the unicast mode for each UE, (ii) an availability of a network bandwidth if the at least one UE is switched from the unicast mode to the broadcast or the multicast node and (iii) a number of users in each of the sub cluster of the UEs.

In some embodiments, the analytics engine performs the switching benefit analysis for the network congestion reduction based on the cost function includes the cost of switching, an available bandwidth per channel, an available time slot per channel and cost of a download bit.

In some embodiments, the analytics engine forms the cluster of UEs based on a mapping between a content ID and a list of corresponding user IDs. In some embodiments, each entry in the offload queue based on the mapping between the content ID and the list of corresponding user IDs.

In some embodiments, the analytics engine predicts future congestion possibilities based on the historical data stored in the database. In some embodiments, the analytics engine predicts a content that is watched by maximum number of users and a possible start time of the content for predicted future congestion possibilities. In some embodiments, the future congestion possibilities are a network congestion and the availability of the network bandwidth.

In some embodiments, the one-to-many offload core schedules the streaming media content in the broadcast or the multicast mode in advance based on the predicted future congestion possibilities to restrict transmission of the streaming media content through the unicast mode to the at least one UE when the at least one UE starts receiving the streaming media content.

In some embodiments, the real-time switching module includes an interface manager, a buffer manager and a processing engine. The interface manager manages the streaming media content in at least one of the unicast mode, and the broadcast or the multicast mode. The buffer manager receives the streaming media content in at least one of the unicast mode, and the broadcast or the multicast mode based on a notification received from the interface manager. The processing engine processes individual frames directly from the buffer manager or a unicast cache or a broadcast or multicast cache. In some embodiments, the processing engine performs decoding of the individual frames and rendering decoded individual frames for viewing.

In some embodiments, the interface manager receives the trigger from the one-to-many offload core and prepares to receive the streaming media content in the broadcast or the multicast mode by tuning to an appropriate frequency and sending the notification to the buffer manager and the processing engine. In some embodiments, the notification includes reception of the streaming media content in the broadcast or the multicast mode.

In some embodiments, the buffer manager starts receiving the streaming media content in the broadcast or the multicast mode and caches corresponding to the broadcast or the multicast mode.

In some embodiments, the processing engine initially processes and renders the streaming media content in the unicast mode. In some embodiments, the processing engine analyzes the individual frames by comparing keyframes that are received from the streaming media content in the unicast mode with keyframes in the caches corresponding to the broadcast or the multicast mode. In some embodiments, the processing engine identifies a keyframe in the caches corresponding to the broadcast or the multicast mode at which processing and rendering are switched from the unicast mode to the broadcast or the multicast mode.

In some embodiments, the processing engine notifies the buffer manager and the interface manager once the switching from the unicast mode to the broadcast or the multicast mode is completed. In some embodiments, the interface manager sends the notification to the buffer manager to (i) stop receiving the streaming media content in the unicast mode and (i) close a unicast connection.

In some embodiments, the analytics engine re-prioritizes the streaming media content to switch the at least one UE from the broadcast or the multicast mode to the unicast mode and the one-to-many offload core schedules the streaming media content to be offloaded from the broadcast or multicast mode to the unicast mode.

In some embodiments, the at least one UE is switched from the broadcast or the multicast mode to the unicast mode if loss of signal strength is occurred due to a movement of the at least one UE in the broadcast or the multicast mode.

In some embodiments, the analytics engine switches a first cluster of UEs from the broadcast or the multicast mode to the unicast mode and switches a second cluster of UEs from the unicast mode to the broadcast or multicast mode by (i) identifying the second cluster of UEs starts receiving a second streaming media content through the unicast mode at a particular time, (ii) identifying that the second cluster of UEs of is causing significant network congestion and to be offloaded to the broadcast or multicast mode, (iii) identifying channels or a bandwidth are not available to offload the second streaming media content on the broadcast or multicast mode, (iv) identifying that a network congestion caused by the second cluster of UEs when receiving the second streaming media content in the unicast mode is significantly higher than the network congestion caused by the first cluster of UEs when receiving the streaming media content in the unicast mode and (v) switching the first cluster of UEs in the broadcast or the multicast mode to the unicast mode and switching the second cluster of UEs from the unicast mode to the broadcast or the multicast mode.

In some embodiments, if the trigger is received from the one-to-many offload core, the buffer manager starts receiving the streaming media content corresponding to the unicast mode and the processing engine renders the streaming media content from the caches corresponding to the unicast mode by matching the keyframes received from the streaming media content in the broadcast or the multicast mode.

In one aspect, a method for switching at least one User Equipment (UE) from a unicast mode to a broadcast or multicast mode to transmit a streaming media content to the at least one User Equipment (UE) is provided. The method includes (i) storing real-time and historical data received from one or more sources in a database, (ii) continuously analyzing, using an analytics engine, the real-time and the historical data stored in the database to identify the at least one UE that receives a streaming media content through the unicast mode and the streaming media content to be offloaded, (iii) generating, using the analytics engine, a cluster of UEs that receive a same streaming media content based on identified UEs, (iv) performing, using the analytics engine, a cluster pruning to generate a sub cluster of UEs from the cluster of UEs, (v) prioritizing and ranking, using the analytics engine, each sub cluster of the UE to be offloaded and placing prioritized sub cluster of the UEs in an offload queue based on a switching benefit analysis, (vi) fetching, using a one-to-many offload core, entries that correspond to the streaming media content and the at least one UE from the offload queue, (vii) scheduling, using the one-to-many offload core, the streaming media content for the broadcast or the multicast mode based on a number of channels and a bandwidth available, (viii) sending, using the one-to-many offload core, a trigger to each of the UEs that needs to start receiving the streaming media content in the broadcast or the multicast modem and (ix) switching, using a real-time switching module associated with the at least one UE, the at least one UE from the unicast mode to the broadcast or the multicast mode based on the trigger received from the one-to-many offload core.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A-3B are table views that illustrate data stored in a database of FIG. 2 according to some embodiments herein;

DETAILED DESCRIPTION OF PREFERRED EMBODIMENTS

Figure 1:
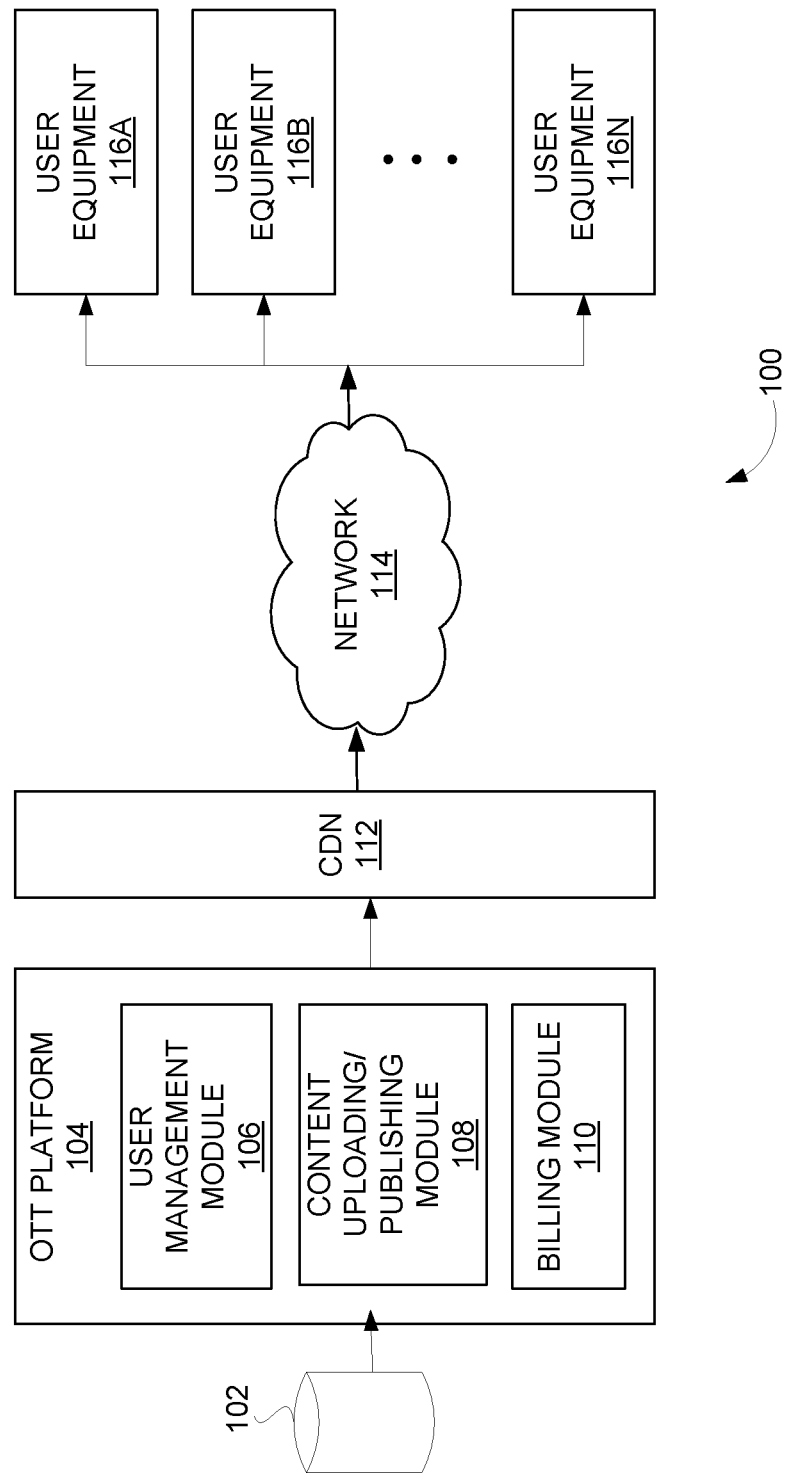
FIG. 1 is a block diagram of a traditional OverTheTop (OTT) architecture for a delivering transmission stream of a streaming media content according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for system and method which can enable the employment of a one to many delivery mechanisms of non-linear streaming media content by: (a) determining probability of a user consuming a particular streaming media content until a particular time duration and (b) Linearly broadcasting/multicasting selected segments of a given content stream which is being consumed by multiple users having different start times. The combination of both the above methods is being referred to "Out-of-Order OTT delivery".

Referring now to the drawings, and more particularly to FIGS. 1 through 9B, where similar reference characters denote corresponding features consistently throughout the figures, there are shown preferred embodiments.

FIG. 1 is a block diagram 100 of a traditional OTT architecture for delivering a transmission stream of a streaming media content according to some embodiments herein. The block diagram 100 includes a OTT database 102 that is associated with an Over-the-top (OTT) platform 104, a Content Delivery/Distribution Network (CDN) 112, a network 114 and one or more user equipment 116A-N. The OTT platform 104 includes a user management module 106, a content uploading/publishing module 108 and a billing module 110. The OTT database 102 includes a media content which is streamed. The OTT platform 104 communicates with the CDN 112. The CDN 112 delivers a transmission stream of the streaming media content via the network 114. In some embodiments, the network 114 is a wired network. In some embodiments, the network 114 is a wireless network. In some embodiments, the network 114 is a combination of the wired network and the wireless network. In some embodiments, the network 114 is the Internet. The one or more user equipment (UE) 116A-N are edge devices that are connected to the network 114 and receive the transmission stream of the streaming media content from the CDN 112. In some embodiments, the one or more user equipment 116A-N are without limitation, may range from a mobile phone, a Personal Digital Assistant (PDA), a tablet, a desktop computer, or a laptop.

Figure 2:
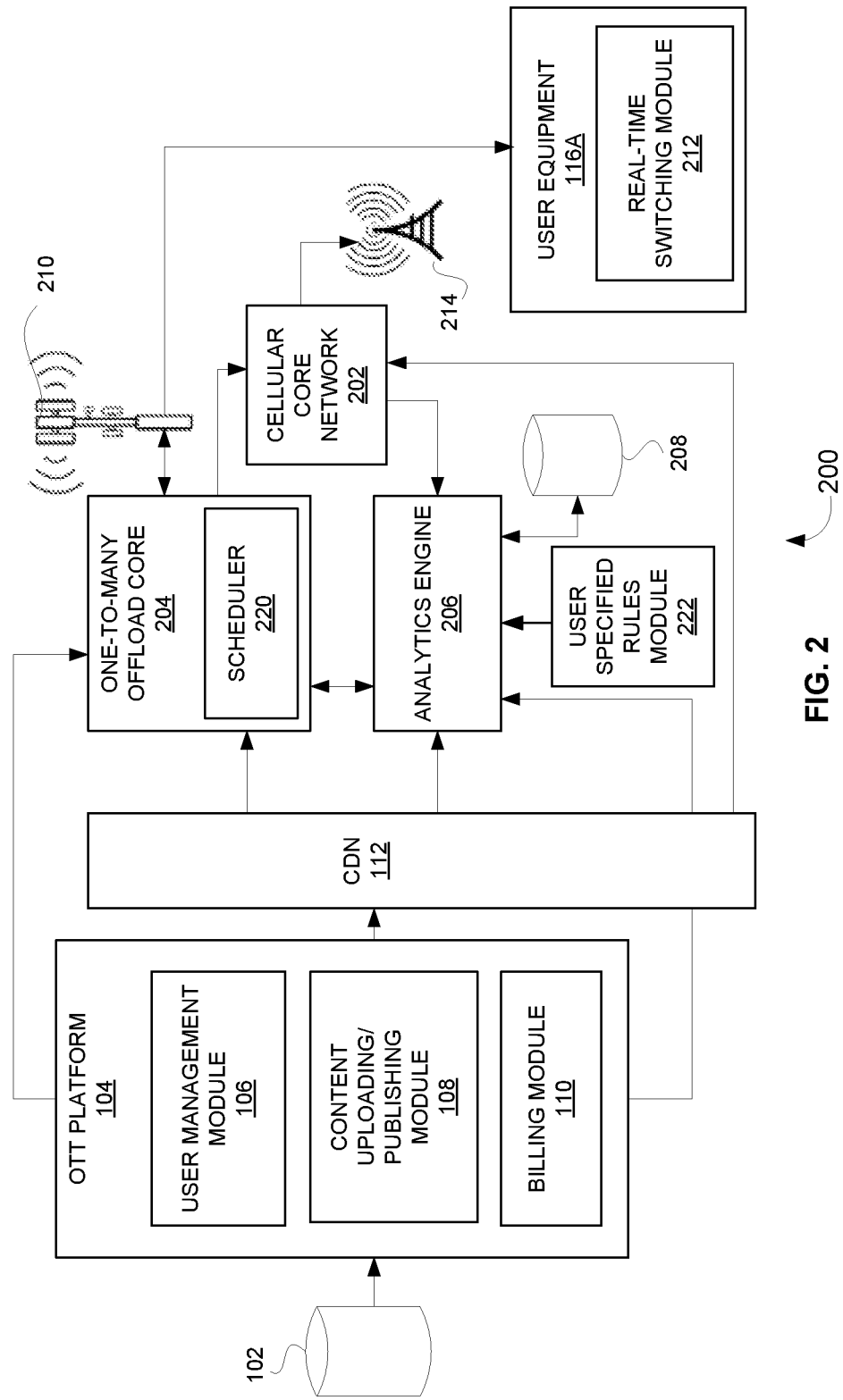
FIG. 2 is a block diagram of a system for switching one or more User Equipment (UE) from a unicast mode to a broadcast or multicast mode to transmit the streaming media content to the one or more User Equipment (UE) according to some embodiments herein.

FIG. 2 is a block diagram 200 of a system for switching the one or more user equipment 116A-N from a unicast mode to a broadcast or multicast mode to transmit a streaming media content to the one or more User Equipment 116A-N (UE) according to some embodiments herein. The block diagram 200 includes the OTT database 102, the OTT platform 104, the CDN 112, the one or more UE 116A-N, a cellular core network 202, an one-to-many offload core 204, an analytics engine 206, a database 208, an one-to-many transmitter 210, a real time switching module 212 associated with a user equipment 116A, a Cellular base station 214 and a user specified rules module 222.

The database 208 stores real-time and historical data received from one or more sources. In some embodiments, the one or more sources include an OverTheTop (OTT) platform 104, the CDN 112, a mobile network provider, the one or more user equipment 116A-N, a social media, a broadcast service provider, external events and the historical data.

In some embodiments, the OTT platform 104 provides OTT Platform data such as user ID, a content ID, content details, e.g., length of the streaming media content, IMD details, details of user location, time remaining for streaming a corresponding media content for each user in the unicast mode, a subscription list, content segment information and user data such as viewing history, time history, etc. In some embodiments, the CDN 112 provides a content ID, IP addresses of the one or more user equipment 116A-N, a round trip delay to the one or more user equipment 116A-N and video play details, e.g., play, stop time or pause time.

In some embodiments, the social media provides top liked or shared contents on social media, e.g., Facebook, Instagram, Snapchat, Twitter, content recommended or liked by a user who has very high followers, videos from news channels, and popular and viral contents.

In some embodiments, the broadcast service provider provides a cost function that includes a cost of switching, an available bandwidth per channel, an available time slot per channel and cost of a download bit. In some embodiments, the external events include natural disasters, emergency alerts, community level useful information government backed notifications, a schedule for over the air software upgrades and scheduled broadcast events such as sports.

In some embodiments, the historical data includes time stamped data, watch history from the OTT platform 104, a user location pattern, congestion data of a mobile network provider, a network congestion pattern and signal strength on edges, broadcast services free bandwidth pattern, a CDN load distribution, a subscription list data in the OTT platform 104 and content recommended data in the social media. In some embodiments, the mobile network provider includes network congestion data, available bandwidth in a cell, historical data on network congestion and time of the day.

In some embodiments, the one or more user equipment 116A-N includes a user ID, a content ID, a device type, e.g., Television, mobile, tablet, signal strength, time of the day, user calendar events, e.g., scheduled to travel, scheduled for an event, and a location of the one or more user equipment 116A-N.

In some embodiments, the analytics engine 206 populates the database 208 with the real-time and historical data from the one or more sources. The analytics engine 206 fetches real-time data from the CDN 112, the Cellular Core Network 202, the OTT platform 104, the one or more UE 116A-N, etc.

The analytics engine 206 continuously analyzes the real-time and the historical data stored in the database 208 to identify the one or more user equipment 116A-N that receive a streaming media content through the unicast mode and the streaming media content to be offloaded. In some embodiments, an offload is a process by which certain portions of the streaming media content is shifted from the unicast mode to the broadcast or multicast mode to reduce congestion in the unicast mode. In some embodiments, an analysis happens per Broadcast cell. Each broadcast cell may include one or multiple mobile network cells. Thus, more than one content clusters may get identified for offloading the streaming media content. In some embodiments, the analytics engine 206 identifies "cost" and "benefit" for offloading the streaming media content offload.

The analytics engine 206 generates a cluster of user equipment (UEs) that receive a same streaming media content based on identified UEs. In some embodiments, the analytics engine 206 forms the cluster of UEs based on a mapping between a content ID and a list of corresponding user IDs. In some embodiments, each entry in an offload queue based on the mapping between the content ID and the list of corresponding user IDs.

The analytics engine 206 performs a cluster pruning to generate a sub cluster of UEs from the cluster of UEs. In some embodiments, the analytics engine 206 performs the cluster pruning by estimating the probability of users watching an entire length of the streaming media content in the unicast mode. In some embodiments, the analytics engine 206 estimates the probability based on details associated with the streaming media content and meta-data that includes a duration, and popularity of the streaming media content. In some embodiments, the probability of the users watching the entire length of the streaming media content is estimated based on a time of the day, a device type and the location of the one or more user equipment 116A-N.

In some embodiments, the probability of the users watching the entire length of the streaming media content is estimated based on user location pattern data that includes the location and a commute time for the users. In some embodiments, the commute time for the users is estimated based on changes in the location of the one or more user equipment 116A-N. In some embodiments, the probability of the users watching the streaming media content is high for the commute time of the users. In some embodiments, the probability of the users watching the entire length of the streaming media content is estimated based on multitude of data. In some embodiments, the multitude of data is the OTT platform data includes a subscription list of the users, viewing habits of the users and the viewing history of the users.

In some embodiments, the analytics engine 206 prunes the cluster of UEs by excluding the UEs 116A-N which probability is below a user specified threshold level. In some embodiments, the analytics engine 206 the user specified threshold level is specified in a user specified rules file that is communicated with the analytics engine 206. In some embodiments, the user specified rules file is stored in the user specified rules module 222. In some embodiments, the user specified rules file includes analytics rules. In some embodiments, a Domain Specific Language (DSL) that enables the users to externally specify the analytics rules. In some embodiments, the Domain Specific Language (DSL) enables the users to tune or change a behavior of the analytics engine 206 without having to modify the analytics engine 206.

The analytics engine 206 prioritizes and ranks each sub cluster of the UE to be offloaded and places prioritized sub cluster of the UEs in the offload queue based on a switching benefit analysis. In some embodiments, the analytics engine 206 prioritizes and ranks each sub-cluster of the UEs by computing a network congestion reduction for the each of the sub-clusters of the UEs. In some embodiments, highest reduction in network congestion includes the highest priority in the offload queue.

In some embodiments, the analytics engine 206 performs the switching benefit analysis based on (i) a duration of the streaming media content remaining in the unicast mode for each UE, (ii) an availability of a network bandwidth if the one or more user equipment 116A-N is switched from the unicast mode to the broadcast or the multicast node and (iii) a number of users in each of the sub clusters.

In some embodiments, the analytics engine 206 performs the switching benefit analysis based on the cost function includes a cost of switching, an available time slot per channel and cost of a download bit.

In some embodiments, the analytics engine 206 performs the switching benefit analysis based on at least one of (i) a continuous mode, (ii) a periodic mode, or (iii) an event mode. In some embodiments, the analytics engine 206 continuously processes high frequency data and performs the switching benefit analysis on real time basis in the continuous mode. In some embodiments, the analytics engine 206 accumulates the high frequency data for an extended period of time and the performs the switching benefit analysis periodically in the periodic mode. In some embodiments, the analytics engine 206 is triggered to quantify a viewership of the event in the event mode. In some embodiments, the event includes Advertisement campaigns or political speeches, etc.

In some embodiments, the analytics engine 206 in conjunction with the scheduler 220 associated with the one-to-many offload core 204 performs an optimization task to minimize a load on the unicast mode and to maximize a utilization of the broadcast or the multicast mode. The one-to-many offload core 204 fetches entries that correspond to the streaming media content and the one or more user equipment 116A-N from the offload queue. The one-to-many offload core 204 schedules the streaming media content for the broadcast or the multicast mode based on the number of channels and the available bandwidth.

The one-to-many offload core 204 sends a trigger to each of the UEs that needs to start receiving the streaming media content in the broadcast or the multicast mode. The real-time switching module 212 associated with each user equipment 116A-N that switches the one or more user equipment 116A-N from the unicast mode to the broadcast or the multicast mode based on the trigger received from the one-to-many offload core 204. Each user equipment 116A-N includes a one-to-many receiver that receives the streaming media content in the broadcast or the multicast mode. In some embodiments, the one-to-many receiver receives the streaming media content in terrestrial satellite communication, cellular broadcast, or optical and cabled communication.

In some embodiments, if the one-to-many offload core 204 offloaded a previously identified streaming media content, the analytics engine 206 performs the switching benefit analysis continuously to update of the offload queue.

In some embodiments, if a broadcast pipe that operates in a Single Frequency Network (SFN) mode, a section of the bandwidth may be curved out to provide hyperlocal services in a Multi Frequency Network (SFN) mode. In some embodiments, some part of the broadcast pipe may be partitioned to provide unicast services in a form of a supplementary downlink channel. In some embodiments, the analytics engine 206 identifies the one or more user equipment 116A-N for the supplemental downlink delivery if the analytics engine 206 determines that a particular streaming media content that is not suitable for the broadcast or the multicast mode. In some embodiments, the analytics engine 206 determines the particular streaming media content is not suitable for the broadcast or the multicast mode based on the location or the cost function of the one or more user equipment 116A-N. In some embodiments, a broadcast or multicast coverage that permits a usage of the Multi Frequency Network (MFN) mode of operation. In some embodiments, the Multi Frequency Network mode of operation is used if a consumption of the particular streaming media content is highly localized.

In some embodiments, the analytics engine 206 predicts future congestion possibilities based on the historical data stored in the database 208. In some embodiments, the analytics engine 206 predicts a content that is watched by maximum number of users and a possible start time of the content for predicted future congestion possibilities. In some embodiments, the future congestion possibilities are a network congestion and the availability of the network bandwidth. In some embodiments, the one-to-many offload core 204 schedules the streaming media content in the broadcast or the multicast mode in advance based on the predicted future congestion possibilities to restrict transmission of the streaming media content through the unicast mode to the one or more user equipment 116A-N when the one or more user equipment 116A-N starts receiving the streaming media content.

In some embodiments, the analytics engine 206 re-prioritizes the streaming media content to switch the one or more user equipment 116A-N from the broadcast or the multicast mode to the unicast mode, and the one-to-many offload core 204 schedules the streaming media content to be offloaded from the broadcast or multicast mode to the unicast mode. The one or more user equipment 116A-N are switched from the broadcast or the multicast mode to the unicast mode if loss of signal strength is occurred due to a movement of the one or more user equipment 116A-N in the broadcast or the multicast mode. The analytics engine 206 switches a first cluster of UEs from the broadcast or the multicast mode to the unicast mode and switches a second cluster of UEs from the unicast mode to the broadcast or multicast mode by (i) identifying the second cluster of UEs starts receiving a second streaming media content through the unicast mode at a particular time, (ii) identifying that the second cluster of UEs of is causing significant network congestion and to be offloaded to the broadcast or multicast mode, (iii) identifying channels or a bandwidth are not available to offload the second streaming media content on the broadcast or multicast mode and (iv) identifying that a network congestion caused by the second cluster of UEs when receiving the second streaming media content in the unicast mode is significantly higher than the network congestion caused by the first cluster of UEs when receiving the streaming media content in the unicast mode and (v) switching the first cluster of UEs in the broadcast or the multicast mode to the unicast mode and switching the second cluster of UEs from the unicast mode to the broadcast or multicast mode.

FIGS. 3A-3B are table views that illustrate data stored in the database 208 of FIG. 2 according to some embodiments herein. The table includes data from an OTT platform 302, a CDN 304, a mobile network provider 306, one or more user devices 308, social media 310, a broadcast service provider 312, external events 314 and historical data 316. The OTT platform 302 includes OTT Platform data such as user ID, a content ID, content details, e.g., length of the streaming media content, IMD details, and other content metadata such as content rating, cast, duration, etc., details of user location, time remaining for streaming a corresponding media content for each user in an unicast mode, a subscription list, content segment information and user data such as viewing history, time history, etc. The CDN 304 includes content ID, IP addresses of the one or more user equipment 116A-N, a round trip delay to the one or more user equipment 116A-N and video play details, e.g., play, stop time or pause time.

The mobile network provider 306 includes network congestion data, available bandwidth in a cell, historical data on network congestion and time of the day. The one or more user equipment 308 includes a user ID, a content ID, a device type, e.g., Television, mobile, tablet, signal strength, time of the day, user calendar events, e.g., scheduled to travel, scheduled for an event, and a location of the one or more user equipment 116A-N. The social media 310 includes top liked or shared contents on social media, e.g., Facebook, Instagram, Snapchat, Twitter, content recommended or liked by a user who has very high followers, videos from news channels, and popular and viral contents. The broadcast service provider 312 includes provides a cost function that includes a cost of switching, an available bandwidth per channel, an available time slot per channel, cost of a download bit and monetization factor.

The external events 314 include natural disasters, emergency alerts, community level useful information government backed notifications, a schedule for over the air software upgrades and scheduled broadcast events such as sports. The historical data 316 includes time stamped data, watch history from the OTT platform 104, a user location pattern, congestion data of a mobile network provider, a network congestion pattern and signal strength on edges, broadcast services free bandwidth pattern, a CDN load distribution, a subscription list data in the OTT platform 104 and content recommended data in the social media.

Figure 4:
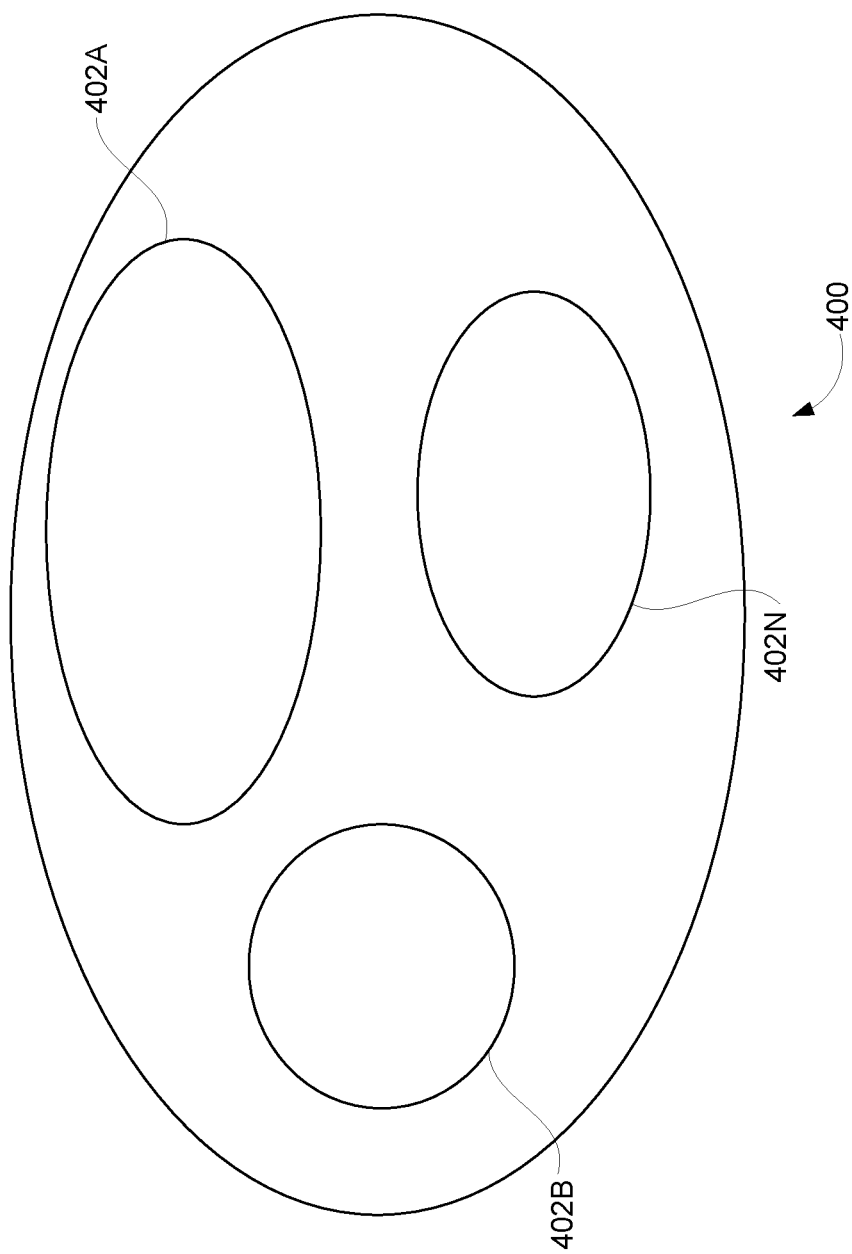
FIG. 4 is an exemplary view that illustrates clusters of UEs that receive a same streaming media content at a similar timeline with-in a same geographical area of that content's playback according to some embodiments herein.

FIG. 4 is an exemplary view 400 that illustrates clusters 402A-N of the UEs 116A-N that receive a same streaming media content at a similar timeline of that content's playback with a time off-set and with-in a same geographical area, according to some embodiments herein. The analytics engine 206 continuously analyzes real-time and the historical data 316 stored in the database 208 to identify the one or more user equipment 116A-N that receives the same streaming media content at the similar timeline of that content's playback with the time off-set and with-in the same geographical area through a unicast mode. In some embodiments, the analytics engine 206 performs an analysis at a granularity of a broadcast cell. In some embodiments, a broadcast cell may contain one or many mobile network cells. The analytics engine 206 generates the clusters 402A-N of the user equipment (UEs) 116A-N that receive the same streaming media content based on identified UEs. The exemplary view 400 represents the one or more user equipment 116A-N that are present in a geographical area of the network 114. The clusters 402A-N relate to either different streaming media content. For example, 402A may represent a movie, 402B may represent a TV show, etc.

Figure 5:
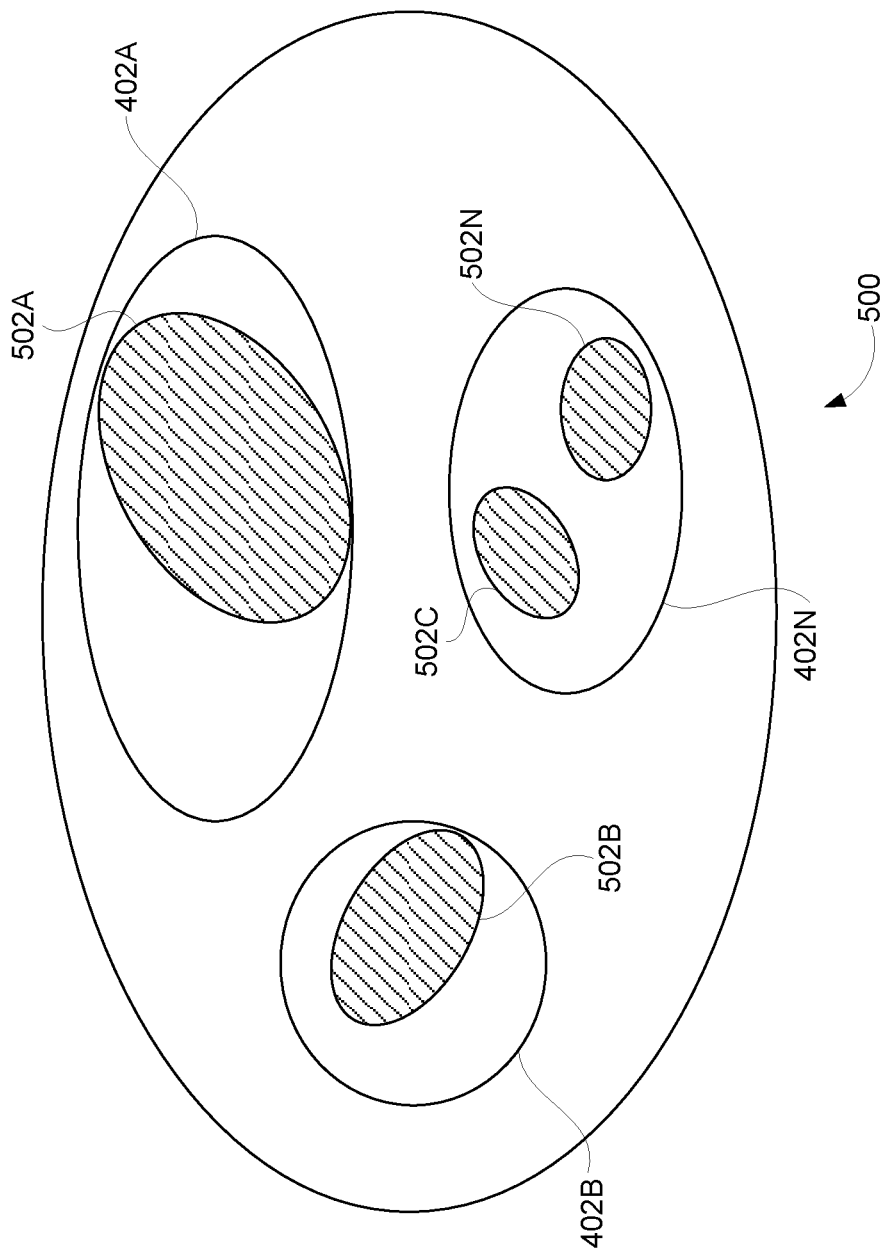
FIG. 5 is an exemplary view of sub-clusters that are generated from the clusters of UEs of FIG. 4 according to some embodiments herein.

FIG. 5 is an exemplary view 500 of sub-clusters 502A-N of the UEs 116A-N that are generated from the clusters of UEs 402A-N of FIG. 4 according to some embodiments herein. In some embodiments, the analytics engine 206 prioritizes and ranks each of the sub-clusters 502A-N of the UEs 116A-N and places the sub-clusters 502A-N of the UEs 116A-N in an offload queue of the one-to-many offload core 204 based on a switching benefit analysis. In some embodiments, the analytics engine 206 prioritizes and ranks each sub-cluster 502A-N of the UEs 116A-N by computing a network congestion reduction for the each of the sub-clusters 502A-N of the UEs 116A-N. In some embodiments, highest reduction in network congestion includes the highest priority in the offload queue. In some embodiments, users who frequently change the streaming media content may be ranked lower than the users who views the same streaming media content. In some embodiments, if a sub-cluster, e.g. a sub-cluster 502A includes highest reduction in network congestion, the analytics engine 206 places the sub-cluster, e.g. the sub-cluster 502A as a first entry in the offload queue followed by 502C, 502N. In some embodiments, a new sub-cluster may include the highest priority than an existing entry in the offloaded queue and replacing an existing sub-cluster entry with the new sub-cluster. In some embodiments, the analytics engine 206 performs the switching benefit analysis based on at least one of (i) a continuous mode, (ii) a periodic mode, or (iii) an event mode.

In some embodiments, if a common media content is consumed on the one or more UEs 116A-N at different instances, the analytics engine 206 may sent most optimal segments corresponding to a later part of contents over the broadcast or the multicast mode to offload a maximum number of users and reduce a bandwidth that is consumed in a broadcast pipe so that other content may also be offloaded. In some embodiments, if delivery of a video content using adaptive streaming methods such as DASH, the video resolution and compression may be optimized to accommodate a maximum number of streams and to maintain a predefined video quality.

Figure 6:
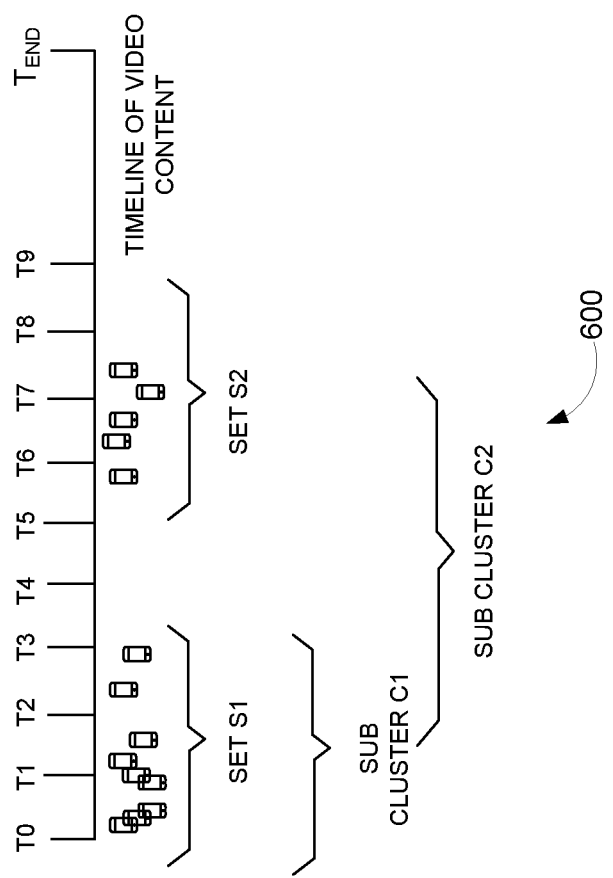
FIG. 6 illustrates an exemplary view of a timeline T0 to $T_{END}$ of a streaming media content which is of $T_{END}$ duration according to some embodiments herein.

FIG. 6 illustrates an exemplary view 600 of a timeline T0 to $T_{END}$ of a streaming media content which is of $(T_{END}-T0)$ duration according to some embodiments herein. In some embodiments, timeline markers indicate an entire length of the streaming media content to be consumed by the one or more user equipment 116A-N through a unicast mode. In some embodiments, a set S1 that includes one or more UEs that receives the streaming media content of a length less than T3 (say around T2). In some embodiments, a set S2 that includes the one or more UEs that starts receiving the same streaming media content which is earlier than the one or more UEs in the set S1. In some embodiments, the analytics engine 206 identifies the set S1 and the set S2 using a mapping between a key being the time line marker and an entry being a list of UE ids that may be moved that particular time line marker and a total number of such UEs to the broadcast or the multicast mode. In some embodiments, each entry is a sub cluster.

In some embodiments, the length of streaming media content consumed by the one or more UEs in the set S2 is higher than the length of streaming media content consumed by the one or more UEs in the set S1 (say around T7). In some embodiments, the one or more UEs in a sub cluster C1 (the set S1) may be switched to a broadcast or a multicast mode for the length T3 to $T_{END}$. In some embodiments, a sub cluster C2 (the set S1 and the S2) may be switched to the broadcast or the multicast mode from T8 to $T_{END}$. In some embodiments, all UEs in the sub cluster C1 may continue in the unicast mode till T3. In some embodiments, all UEs in the sub cluster C2 may continue to in the unicast mode from T5 to T8.

In some embodiments, the analytics engine 206 prioritizes and ranks the sub-cluster C1 and the sub-cluster C2 of the UEs by computing a network congestion reduction for the sub-cluster C1 and the sub-cluster C2 of the UEs. In some embodiments, the analytics engine 206 performs the switching benefit analysis for the network congestion reduction based on (i) a duration of the streaming media content remaining in the unicast mode for each UE, (ii) an availability of a network bandwidth if the at least one UE is switched from the unicast mode to the broadcast or the multicast node, and (iii) a number of users in each of the sub cluster C1 and the sub-cluster C2 of the UEs.

In some embodiments, if a number of UEs in the set S2 is higher than number of UEs in the set S1, reduction in congestion by switching the sub-cluster C2 may be higher even if the set S1 receives the streaming media content till T8. In some embodiments, if the sub-cluster C1 is estimated to provide higher switching benefit and the sub-cluster C1 switched to the broadcast or the multicast mode, then the set S2 may be continued in the unicast mode. In some embodiments, the analytics engine 206 performs the switching benefit analysis for the network congestion reduction based on a cost function includes a cost of switching, an available bandwidth per channel, an available time slot per channel and cost of a download bit.

Figure 7:
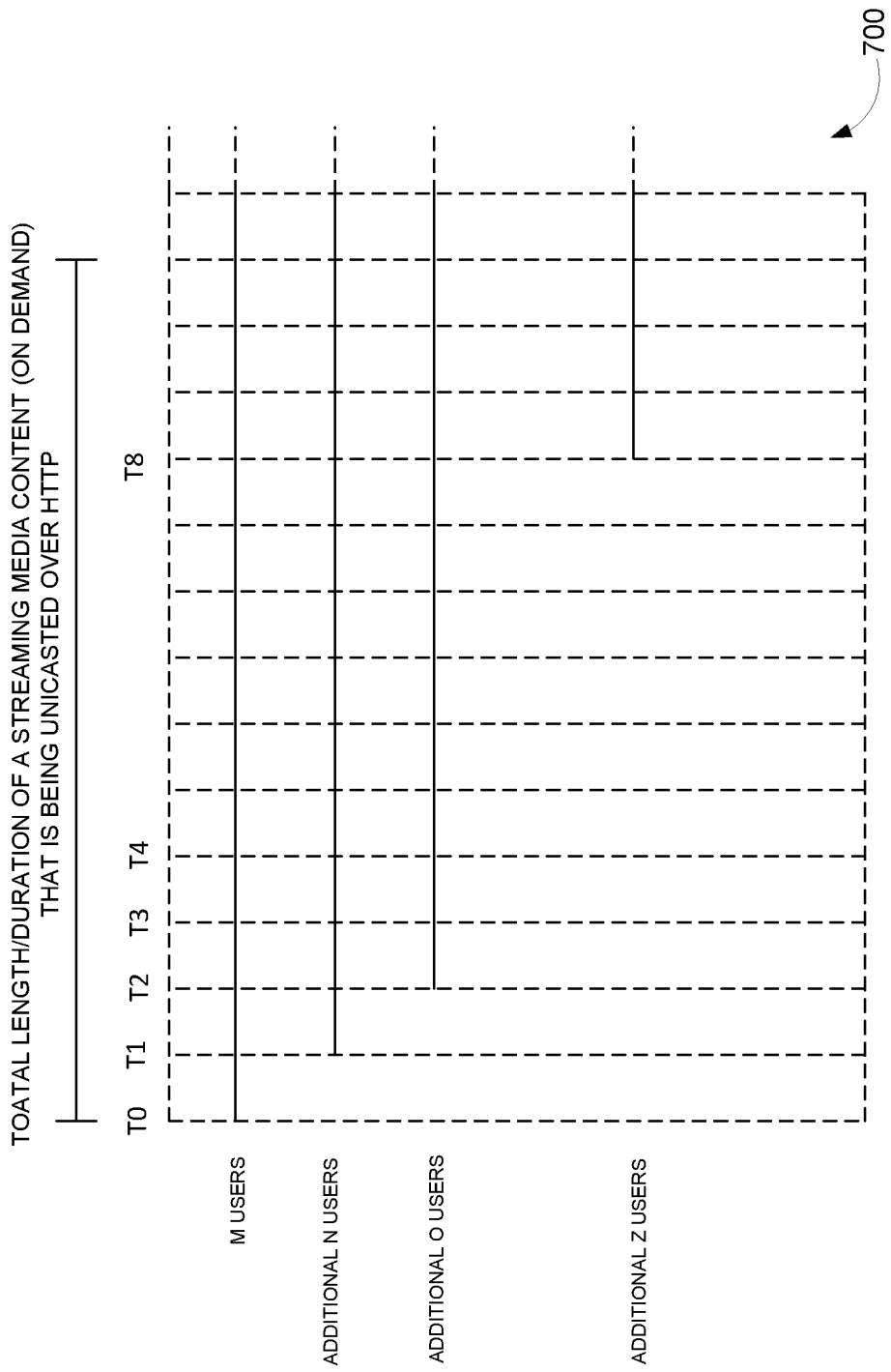
FIG. 7 is a timing diagram that illustrates offloading a streaming media content from a unicast mode to a broadcast or a multicast mode according to some embodiments herein.

FIG. 7 is a timing diagram 700 that illustrates offloading a streaming media content from a unicast mode to a broadcast or a multicast mode according to some embodiments herein. The timing diagram 700 illustrates M number of users watching the streaming media content at T0. In some embodiments, N number of users start watching the same streaming media content at T1. In some embodiments, O number of users start watching the same streaming media content at T2. In some embodiments, at time T8, Z number of users start watching the same streaming media content. Thus, (M+N+O) a total of number of users are watching the same content at T2 but with a time offset. The analytics engine 206 decides at time T2 that the above users' needs to be switched to the broadcast or the multicast mode instead of the current unicast mode. In some embodiments, the one-to-many offload core 204 sends a trigger to each of the UEs to switch to the broadcast or the multicast mode from the unicast mode.

Figure 8:
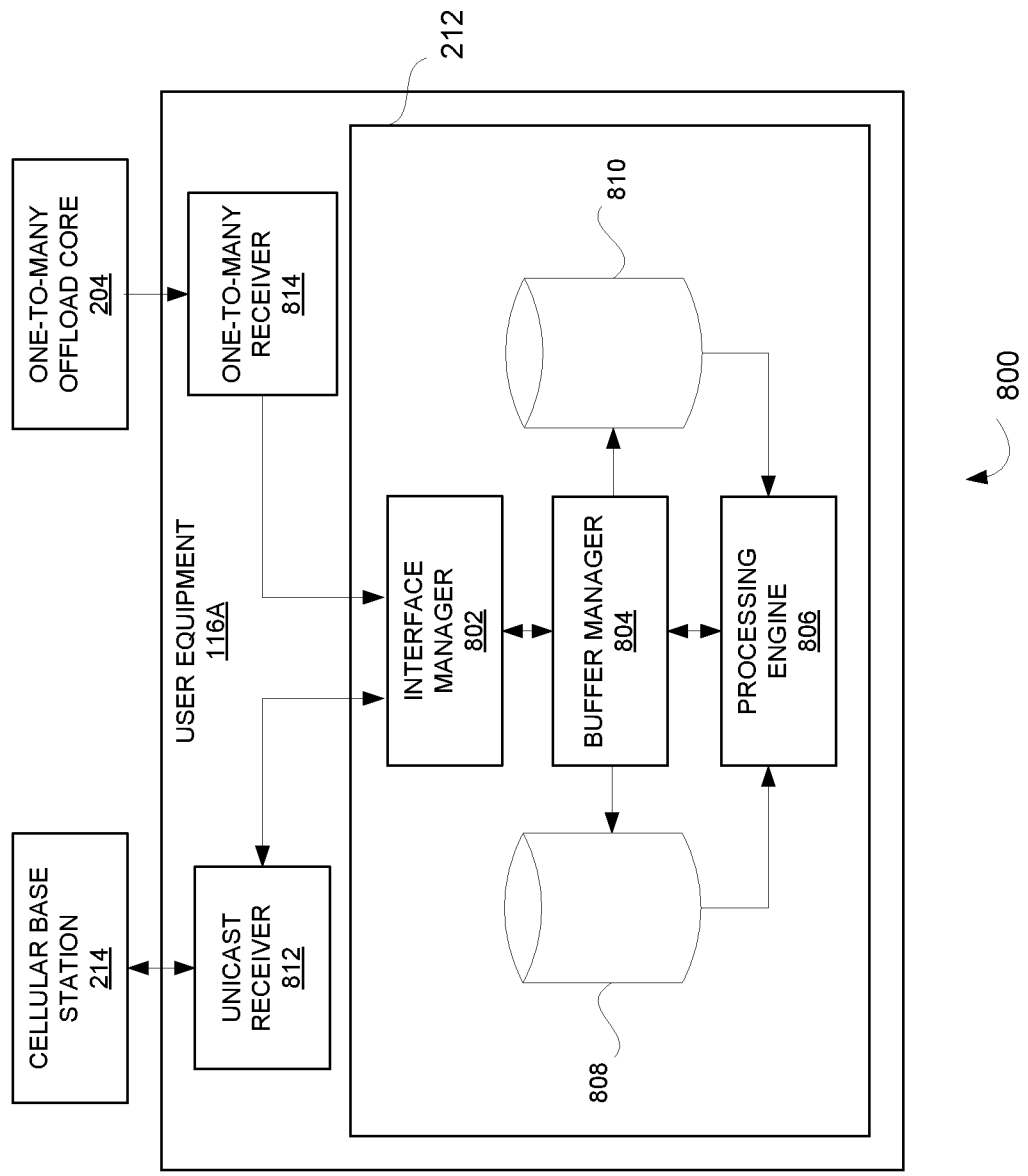
FIG. 8 is a block diagram that illustrates a real-time switching module of FIG. 2 according to some embodiments herein.

FIG. 8 is a block diagram 800 that illustrates the real-time switching module 212 of FIG. 2 according to some embodiments herein. The user equipment 116A includes the real-time switching module 212, a unicast modem 812 and a one-to-many receiver 814. The unicast modem 812 receives a streaming media content in a unicast mode at the user equipment 116 from the cellular base station 214. The one-to-many receiver 814 receives the streaming media content at the user equipment 116 from the one-to-many transmitter 210. The real-time switching module 212 includes an interface manager 802, a buffer manager 804, a processing engine 806, a unicast cache database 808, and a broadcast/multicast cache database 810. The one-to-many offload core 204 communicates with an interface manager 802.

The interface manager 802 manages the streaming media content in at least one of the unicast mode, and the broadcast or the multicast mode. The buffer manager 804 receives the streaming media content in at least one of the unicast mode, and the broadcast or the multicast mode based on a notification received from the interface manager 802. The processing engine 806 processes individual frames directly from the buffer manager 804 or a unicast cache or a broadcast or multicast cache. In some embodiments, the processing engine 804 performs decoding of the individual frames and rendering decoded individual frames for viewing. In some embodiments, an application on the UE 116A is initially rendering the streaming media content in the unicast mode.

The interface manager 802 receives a trigger from the one-to-many offload core 204 and prepares to receive the streaming media content in the broadcast or the multicast mode by tuning to an appropriate frequency and sending the notification to the buffer manager 804. and the processing engine 806. The notification includes reception of the streaming media content in the broadcast or the multicast mode. The buffer manager 804 starts receiving the streaming media content in the broadcast or the multicast mode and caches corresponding to the broadcast or the multicast mode.

The processing engine 806 initially processes and renders the streaming media content in the unicast mode. In some embodiments, the processing engine 806 analyzes the individual frames by comparing keyframes that are received from the streaming media content in the unicast mode with keyframes in the caches corresponding to the broadcast or the multicast mode. In some embodiments, the unicast cache database 808 stores the caches corresponding to the unicast mode. In some embodiments, the broadcast/multicast cache database 810 stores the caches corresponding to the broadcast or the multicast mode. In some embodiments, the processing engine 806 identifies a keyframe in the caches corresponding to the broadcast or the multicast mode at which processing and rendering are switched from the unicast mode to the broadcast or the multicast mode. The processing engine 806 notifies the buffer manager 804 and the interface manager 802 once the switching from the unicast mode to the broadcast or the multicast mode is completed. In some embodiments, the interface manager 802 sends the notification to the buffer manager 804 to (i) stop receiving the streaming media content in the unicast mode and (i) close a unicast connection.

In some embodiments, if a trigger is received from the one-to-many offload core 204 to switch the one or more user equipment 116A-N from the broadcast or the multicast mode to the unicast mode, the buffer manager 804 starts receiving the streaming media content corresponding to the unicast mode and the processing engine 806 renders the streaming media content from the caches corresponding to the unicast mode by matching the keyframes received from the streaming media content in the broadcast or the multicast mode.

Figure 9A:
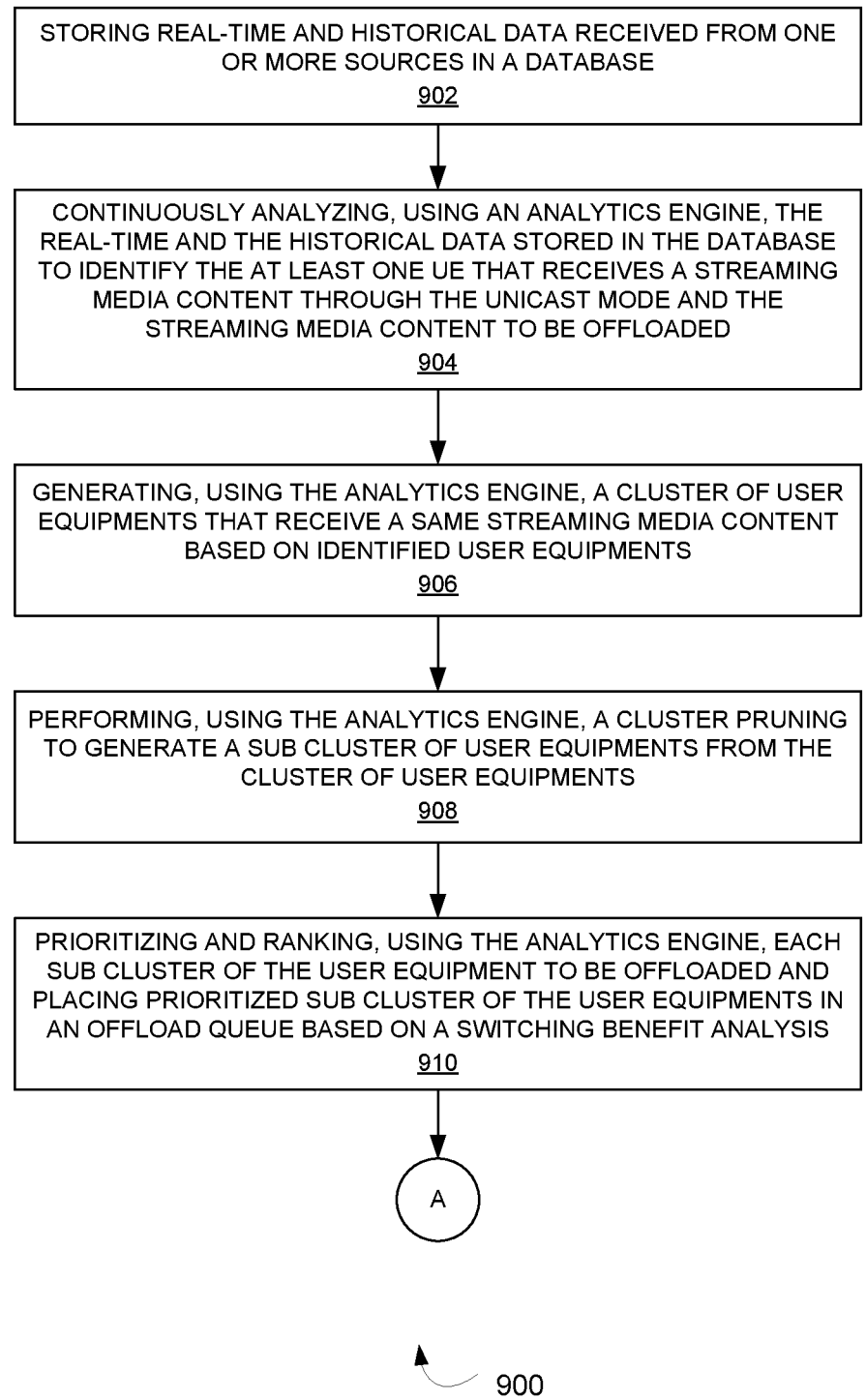
FIGS. 9A-9B are flow diagrams that illustrate a method for switching one or more user equipment from a unicast mode to a broadcast or multicast mode to transmit a streaming media content to the one or more user equipment according to some embodiments herein.
Figure 9B:
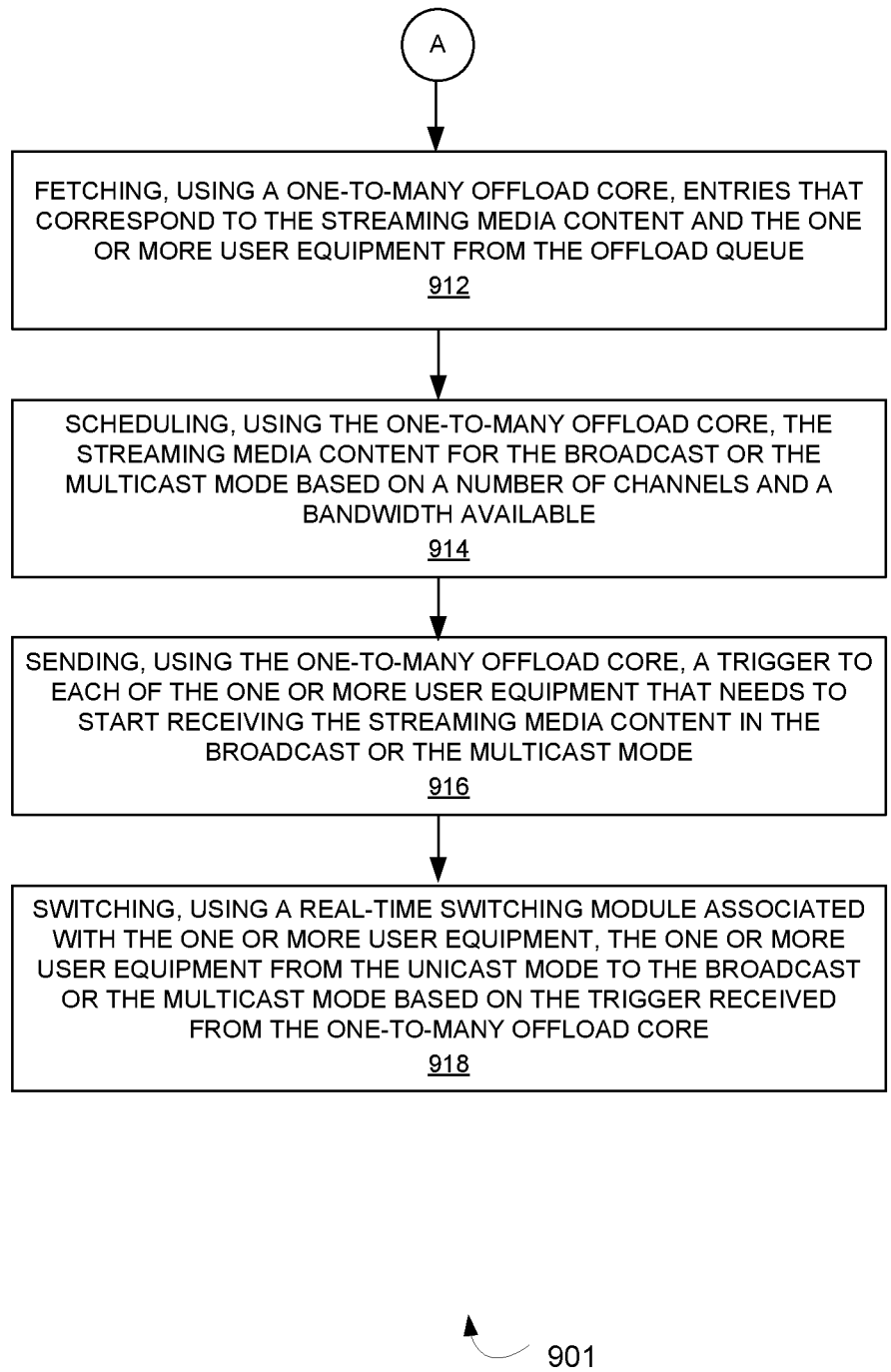

FIGS. 9A-9B are flow diagrams that illustrate a method for switching the one or more User Equipment (UE) 116A-N from a unicast mode to a broadcast or multicast mode to transmit a streaming media content to the one or more user equipment 116A-N according to some embodiments herein. At step 902, a method 900 includes storing real-time and the historical data 316 received from one or more sources in the database 208. At step 904, the method 900 includes continuously analyzing, using the analytics engine 206, the real-time and the historical data 316 stored in the database 208 to identify the one or more user equipment 116A-N that receive a streaming media content through the unicast mode and the streaming media content to be offloaded. At step 906, the method 900 includes generating, using the analytics engine 206, the cluster of UEs that receive a same streaming media content based on identified UEs. At step 908, the method 900 includes performing, using the analytics engine 206, a cluster pruning to generate the sub cluster of UEs from the cluster of UEs. At step 910, the method 900 includes prioritizing and ranking, using the analytics engine 206, each sub cluster of the UE to be offloaded and placing prioritized sub cluster of the UEs in an offload queue based on a switching benefit analysis. FIG. 9B illustrates a method 901 for switching the one or more user equipment 116A-N. At step 912, the method 901 includes fetching, using the one-to-many offload core 204, entries that correspond to the streaming media content and the one or more user equipment 116A-N from the offload queue. At step 914, the method 901 includes scheduling, using the one-to-many offload core 204, the streaming media content for the broadcast or the multicast mode based on a number of channels and a bandwidth available. At step 916, the method 901 includes sending, using the one-to-many offload core 204, a trigger to each of the UEs that needs to start receiving the streaming media content in the broadcast or the multicast mode. At step 918, the method 901 includes switching, using the real-time switching module 212 associated with each user equipment 116A-N, the one or more user equipment 116A-N from the unicast mode to the broadcast or the multicast mode based on the trigger received from the one-to-many offload core 204.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the invention.

What is claimed is:
1. A system for switching at least one User Equipment (UE) from a unicast mode to a broadcast or multicast mode to transmit a streaming media content to the at least one User Equipment (UE), the system comprising:
a database that stores real-time and historical data received from a plurality of sources;
an analytics engine that
continuously analyzes the real-time and the historical data stored in the database to identify the at least one UE that receives a streaming media content through the unicast mode and the streaming media content to be offloaded, wherein an offload is a process by which certain portions of the streaming media content is shifted from the unicast mode to the broadcast or multicast mode;
generates a cluster of UEs that receive a same streaming media content based on identified UEs;
performs a cluster pruning to generate a sub cluster of UEs from the cluster of UEs;
prioritizes and ranks each sub cluster of the UEs to be offloaded and places prioritized sub cluster of the UEs in an offload queue based on a switching benefit analysis;
a one-to-many offload core that
fetches entries that correspond to the streaming media content and the at least one UE from the offload queue;
schedules the streaming media content for the broadcast or the multicast mode based on a number of channels and an available bandwidth; and sends a trigger to each of the UEs that needs to start receiving the streaming media content in the broadcast or the multicast mode; and a real-time switching module associated with the at least one UE that switches the at least one UE from the unicast mode to the broadcast or the multicast mode based on the trigger received from the one-to-many offload core.

2. The system of claim 1, wherein the analytics engine identifies the at least one UE for a supplemental downlink delivery if the analytics engine determines that a particular streaming media content that is not suitable for the broadcast or the multicast mode, wherein at least one part of a broadcast pipe is partitioned to provide unicast services in a form of the supplementary downlink channel, wherein the analytics engine determines the particular streaming media content is not suitable for the broadcast or the multicast mode based on a location or a cost function of the at least one UE.

3. The system of claim 1, wherein a broadcast or multicast coverage that permits a usage of a Multi Frequency Network (MFN) mode of operation, wherein the Multi Frequency Network mode of operation is used if a consumption of the particular streaming media content is highly localized.

4. The system of claim 1, wherein the analytics engine performs the cluster pruning by estimating the probability of users watching an entire length of the streaming media content in the unicast mode, wherein the probability is estimated based on details associated with the streaming media content and meta-data that includes a duration, and popularity of the streaming media content.

5. The system of claim 4, wherein the analytics engine estimates a duration of the streaming media content remaining to be transmitted in the unicast mode based on OTT Platform data that comprises time remaining for streaming a corresponding media content for each user in the unicast mode.

6. The system of claim 4, wherein the analytics engine prunes the cluster of UEs by excluding UEs which probability is below a user specified threshold level, wherein the user specified threshold level is specified in a user specified rules file that is communicated with the analytics engine, wherein the user specified rules file comprises analytics rules.

7. The system of claim 6, comprises a Domain Specific Language (DSL) that enables the users to externally specify the analytics rules, wherein the Domain Specific Language (DSL) enables the users to tune or change a behavior of the analytics engine without having to modify the analytics engine.

8. The system of claim 1, wherein the analytics engine performs the switching benefit analysis based on at least one of (i) a continuous mode, (ii) a periodic mode, or (iii) an event mode, wherein the analytics engine continuously processes high frequency data and performs the switching benefit analysis on real time basis in the continuous mode, wherein the analytics engine accumulates the high frequency data for an extended period of time and the performs the switching benefit analysis periodically in the periodic mode, wherein the analytics engine is triggered to quantify a viewership of an event in the event mode.

9. The system of claim 1, wherein the analytics engine prioritizes and ranks each sub-cluster of the UEs by computing a network congestion reduction for each sub-cluster of the UEs, wherein highest reduction in network congestion comprises the highest priority in the offload queue.

10. The system of claim 9, wherein the analytics engine performs the switching benefit analysis for the network congestion reduction based on (i) a duration of the streaming media content remaining in the unicast mode for each UE, (ii) an availability of a network bandwidth if the at least one UE is switched from the unicast mode to the broadcast or the multicast node and (iii) a number of users in each sub cluster of the UEs.

11. The system of claim 1, wherein the analytics engine forms the cluster of UEs based on a mapping between a content ID and a list of corresponding user IDs, wherein each entry in the offload queue based on the mapping between the content ID and the list of corresponding user IDs.

12. The system of claim 1, wherein the analytics engine predicts future congestion possibilities based on the historical data stored in the database, wherein the analytics engine predicts a content that is watched by maximum number of users and a possible start time of the content for predicted future congestion possibilities, wherein the future congestion possibilities are a network congestion and the availability of the network bandwidth.

13. The system of claim 12, wherein the one-to-many offload core schedules the streaming media content in the broadcast or the multicast mode in advance based on the predicted future congestion possibilities to restrict transmission of the streaming media content through the unicast mode to the at least one UE when the at least one UE starts receiving the streaming media content.

14. The system of claim 1, wherein the real-time switching module comprises
an interface manager that manages the streaming media content in at least one of the unicast mode, and the broadcast or the multicast mode;
a buffer manager that receives the streaming media content in at least one of the unicast mode, and the broadcast or the multicast mode based on a notification received from the interface manager; and
a processing engine that processes individual frames directly from the buffer manager or a unicast cache or a broadcast or multicast cache, wherein the processing engine performs decoding of the individual frames and rendering decoded individual frames for viewing.

15. The system of claim 14, wherein the interface manager receives the trigger from the one-to-many offload core and prepares to receive the streaming media content in the broadcast or the multicast mode by tuning to an appropriate frequency and sending the notification to the buffer manager and the processing engine, wherein the notification comprises reception of the streaming media content in the broadcast or the multicast mode.

16. The system of claim 15, wherein the buffer manager starts receiving the streaming media content in the broadcast or the multicast mode and caches corresponding to the broadcast or the multicast mode.

17. The system of claim 14, wherein the processing engine initially processes and renders the streaming media content in the unicast mode, wherein the processing engine analyzes the individual frames by comparing keyframes that are received from the streaming media content in the unicast mode with keyframes in the caches corresponding to the broadcast or the multicast mode, wherein the processing engine identifies a keyframe in the caches corresponding to the broadcast or the multicast mode at which processing and rendering are switched from the unicast mode to the broadcast or the multicast mode.

18. The system of claim 17, wherein the processing engine notifies the buffer manager and the interface manager once the switching from the unicast mode to the broadcast or the multicast mode is completed, wherein the interface manager sends the notification to the buffer manager to (i) stop receiving the streaming media content in the unicast mode and (i) close a unicast connection.

19. The system of claim 1, wherein the analytics engine re-prioritizes the streaming media content to switch the at least one UE from the broadcast or the multicast mode to the unicast mode and the one-to-many offload core schedules the streaming media content to be offloaded from the broadcast or multicast mode to the unicast mode.

20. The system of claim 19, wherein the at least one UE is switched from the broadcast or the multicast mode to the unicast mode if loss of signal strength is occurred due to a movement of the at least one UE in the broadcast or the multicast mode.

21. The system of claim 19, wherein the analytics engine switches a first cluster of UEs from the broadcast or the multicast mode to the unicast mode and switches a second cluster of UEs from the unicast mode to the broadcast or multicast mode by
- identifying the second cluster of UEs starts receiving a second streaming media content through the unicast mode at a particular time;
- identifying that the second cluster of UEs of is causing significant network congestion and to be offloaded to the broadcast or multicast mode;
- identifying channels or a bandwidth are not available to offload the second streaming media content on the broadcast or multicast mode;
- identifying that a network congestion caused by the second cluster of UEs when receiving the second streaming media content in the unicast mode is significantly higher than the network congestion caused by the first cluster of UEs when receiving the streaming media content in the unicast mode; and
- switching the first cluster of UEs in the broadcast or the multicast mode to the unicast mode and switching the second cluster of UEs from the unicast mode to the broadcast or multicast mode.

22. The system of claim 19, wherein if the trigger is received from the one-to-many offload core, the buffer manager starts receiving the streaming media content corresponding to the unicast mode and the processing engine renders the streaming media content from the caches corresponding to the unicast mode by matching the keyframes received from the streaming media content in the broadcast or the multicast mode.

23. A method for switching at least one User Equipment (UE) from a unicast mode to a broadcast or multicast mode to transmit a streaming media content to the at least one User Equipment (UE), the method comprising:
- storing real-time and historical data received from a plurality of sources in a database;
- continuously analyzing, using an analytics engine, the real-time and the historical data stored in the database to identify the at least one UE that receives a streaming media content through the unicast mode and the streaming media content to be offloaded, wherein an offload is a process by which certain portions of the streaming media content is shifted from the unicast mode to the broadcast or multicast mode;
- generating, using the analytics engine, a cluster of UEs that receive a same streaming media content based on identified UEs;
- performing, using the analytics engine, a cluster pruning to generate a sub cluster of UEs from the cluster of UEs;
- prioritizing and ranking, using the analytics engine, each sub cluster of the UE to be offloaded and placing prioritized sub cluster of the UEs in an offload queue based on a switching benefit analysis;
- fetching, using a one-to-many offload core, entries that correspond to the streaming media content and the at least one UE from the offload queue;
- scheduling, using the one-to-many offload core, the streaming media content for the broadcast or the multicast mode based on a number of channels and a bandwidth available;
- sending, using the one-to-many offload core, a trigger to each of the UEs that needs to start receiving the streaming media content in the broadcast or the multicast mode; and
- switching, using a real-time switching module associated with the at least one UE, the at least one UE from the unicast mode to the broadcast or the multicast mode based on the trigger received from the one-to-many offload core.

* * * * *